United States Patent
Maeda et al.

(10) Patent No.: US 9,542,607 B2
(45) Date of Patent: Jan. 10, 2017

(54) LANE BOUNDARY LINE RECOGNITION DEVICE AND COMPUTER-READABLE STORAGE MEDIUM STORING PROGRAM OF RECOGNIZING LANE BOUNDARY LINES ON ROADWAY

(71) Applicant: DENSO CORPORATION, Kariya, Aichi-pref. (JP)

(72) Inventors: Yuu Maeda, Ichinomiya (JP); Naoki Kawasaki, Kariya (JP); Syunya Kumano, Gothenburg (SE); Shunsuke Suzuki, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/790,471

(22) Filed: Jul. 2, 2015

(65) Prior Publication Data
US 2016/0012299 A1  Jan. 14, 2016

(30) Foreign Application Priority Data
Jul. 11, 2014  (JP) .................. 2014-142962

(51) Int. Cl.
*G06K 9/00* (2006.01)
*G06T 7/20* (2006.01)
(Continued)

(52) U.S. Cl.
CPC ......... *G06K 9/00798* (2013.01); *G06K 9/4604* (2013.01); *G06T 7/20* (2013.01); *G06T 7/60* (2013.01); *G06T 2207/30256* (2013.01)

(58) Field of Classification Search
USPC ....... 382/100, 103–108, 151, 155, 162, 168, 382/172, 173, 181, 190–199, 209, 219, 382/232, 254, 266, 274, 276, 287–291, 382/305, 312; 701/117; 348/148
See application file for complete search history.

(56) References Cited

U.S. PATENT DOCUMENTS 7,894,632 B2 * 2/2011 Park .................. G06K 9/00798
382/104
2005/0270374 A1 * 12/2005 Nishida ................ G05D 1/0246
348/148
(Continued)

FOREIGN PATENT DOCUMENTS

JP  2005346383  12/2005
JP  2006-331389  12/2006
(Continued)

*Primary Examiner* — Seyed Azarian
(74) *Attorney, Agent, or Firm* — Knobbe, Martens, Olson & Bear, LLP

(57) ABSTRACT

A lane boundary line recognition device detects lane boundary line candidates of a roadway from images captured by an in-vehicle camera, judges that the lane boundary line candidate is a lane boundary line of a branch road, and calculates a curvature of the lane boundary line candidate, and recognizes the lane boundary line based on the calculated curvature. The device removes the lane boundary line candidate, which has been judged as the lane boundary line of the branch road, is removed from a group of the lane boundary line candidates, and calculates the curvature of the lane boundary line candidate based on an estimated rate of change of the curvature. The device uses a past curvature calculated predetermined-number of images before when the lane boundary line candidate is the lane boundary line of the branch road, and resets the estimated rate of change of the curvature to zero.

16 Claims, 6 Drawing Sheets

(51) Int. Cl.
G06K 9/46 (2006.01)
G06T 7/60 (2006.01)
H04N 7/00 (2011.01)

(56) References Cited

U.S. PATENT DOCUMENTS

| | | | | |
|---|---|---|---|---|
| 2006/0239509 A1* | 10/2006 | Saito | .................... | G06K 9/6205 |
| | | | | 382/104 |
| 2009/0157286 A1* | 6/2009 | Saito | .................... | B60W 30/16 |
| | | | | 701/117 |
| 2015/0248763 A1 | 9/2015 | Kumano et al. | | |

FOREIGN PATENT DOCUMENTS

| JP | 2007164636 | 6/2007 |
|---|---|---|
| JP | 2015-166903 A | 9/2015 |

\* cited by examiner

FIG.3
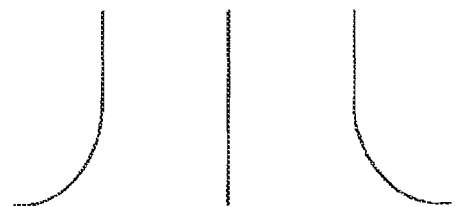
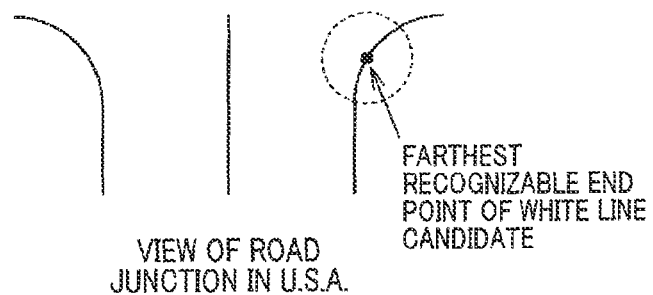
VIEW OF ROAD
JUNCTION IN U.S.A.
FIG.4
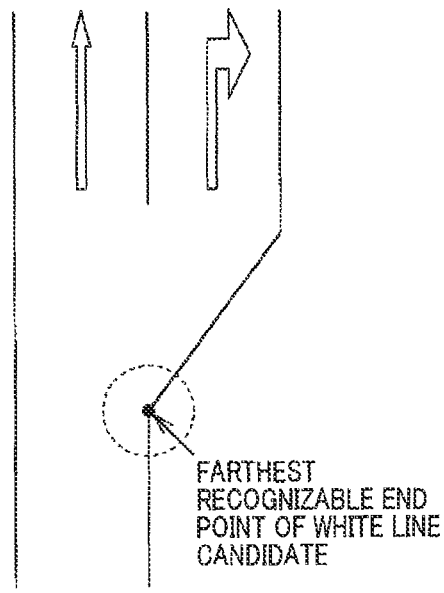
VIEW OF BRANCH ROAD IN JAPAN

FIG.7A
RECOGNIZABLE DISTANCE L OF WHITE LINE CANDIDATE (AT RIGHT SIDE OF OWN VEHICLE LANE)

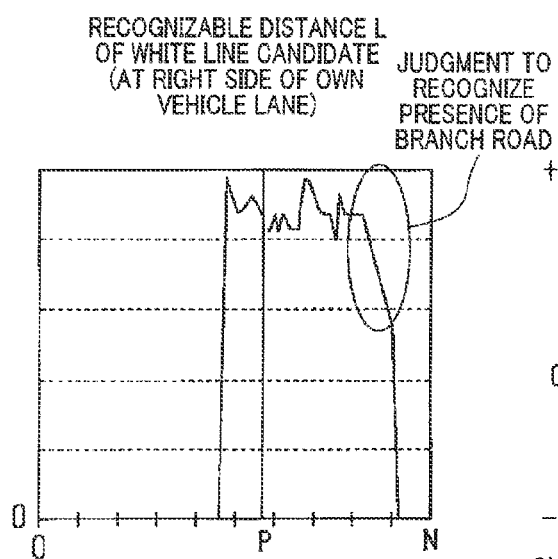

JUDGMENT TO RECOGNIZE PRESENCE OF BRANCH ROAD

FIG.7B
CURVATURE $\rho$ (1/m) OF WHITE LINE CANDIDATE (AT RIGHT SIDE OF OWN VEHICLE LANE)

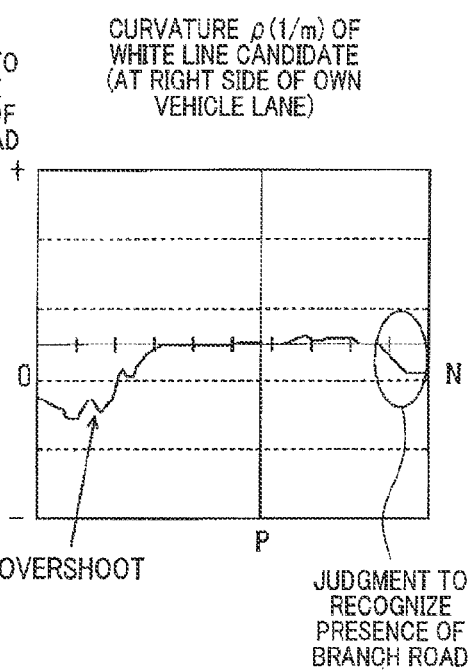

OVERSHOOT

JUDGMENT TO RECOGNIZE PRESENCE OF BRANCH ROAD

FIG.7C
ESTIMATED VALUE (1/m) IN CHANGE OF CURVATURE $\rho$ OF WHITE LINE CANDIDATE

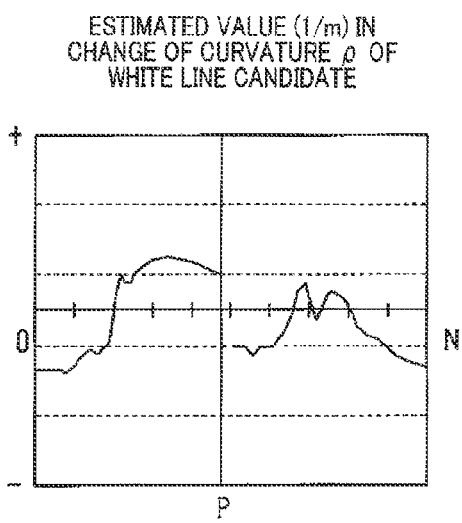

FIG.7D
ESTIMATED RATE (1/m) OF SECOND DIFFERENTIAL OF CURVATURE $\rho$ OF WHITE LINE CANDIDATE

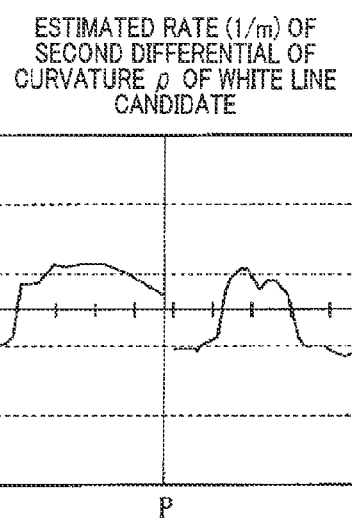

LANE BOUNDARY LINE RECOGNITION DEVICE AND COMPUTER-READABLE STORAGE MEDIUM STORING PROGRAM OF RECOGNIZING LANE BOUNDARY LINES ON ROADWAY

CROSS-REFERENCE TO RELATED APPLICATION

This application is related to and claims priority from Japanese Patent Application No. 2014-142962 filed on Jul. 11, 2014, the contents of which are hereby incorporated by reference.

BACKGROUND OF THE INVENTION

1. Field of the Invention

The present invention relates to lane boundary line recognition devices and computer-readable storage mediums for storing programs capable of recognizing lane boundary lines on a roadway on which an own vehicle drives and assisting a driver of the own vehicle in order to perform driving safely.

2. Description of the Related Art

There has been proposed a driver assist device which detects and recognizes lane boundary lines on an own vehicle lane of a roadway, on which an own vehicle drives, on the basis of images captured by at least an in-vehicle camera mounted on the own vehicle. The driver assist device performs the driver assist of the own vehicle on the basis of the recognized lane boundary lines. The driver assist device provides warning regarding occurrence of abnormalities to the driver of the own vehicle when the own vehicle departs from the own vehicle lane, for example. It is necessary for the driver assist device previously described to correctly detect and recognize the lane boundary lines of the own vehicle lane on the roadway, at a branch road junction and in the presence of a branch road in front of the own vehicle. The branch road branches at the branch road junction from the roadway on which the own vehicle drives. However, there is a possible incorrect recognition for the device to recognize a lane boundary line (or a white line) of a branch road as a lane boundary line of the own vehicle lane when using data regarding the lane boundary lines calculated at the detection timing of the branch road.

In order to avoid such an incorrect recognition, for example, a patent document 1, Japanese patent laid open publication No. 2005-346383, discloses a boundary line detection device which does not use road parameters calculated on the basis of data regarding lane boundary line candidates when detecting that one of two lane boundary lines forming a pair is a lane boundary line of a branch road. By the way, a plurality of pairs of the lane boundary line candidates is extracted from images captured by an in-vehicle camera of the own vehicle. In this case, the boundary line detection device disclosed in the patent document 1 uses past road parameters which have been previously calculated on the basis of the lane boundary lines of the own vehicle lane on the roadway before detecting the presence of the branch road.

The boundary line detection device disclosed in the patent document 1 previously described resets the road parameter including a currently-calculated curvature of the lane boundary line candidate to a past curvature previously calculated when detecting the presence of the branch road. However, this is insufficient for the boundary line detection device to completely avoid the incorrect recognition of the lane boundary lines of the own vehicle lane by using previously-calculated road parameters including the past curvature of the lane boundary line.

SUMMARY

It is therefore desired to provide a lane boundary line recognition device capable of detecting and recognizing lane boundary lines of an own vehicle lane of a roadway, on which an own vehicle drives, with high recognition accuracy, and avoiding incorrect recognition of the lane boundary line of the own vehicle lane due to the presence of a lane boundary line of a branch road.

An exemplary embodiment provides a lane boundary line recognition device having a detection section, a branch judgment section, and a recognition section. The detection section detects lane boundary line candidates of a roadway on the basis of images or frame images of the roadway around an own vehicle transmitted from an in-vehicle camera. The branch judgment section judges whether or not the lane boundary line candidate detected by the detection section corresponds to a lane boundary line of a branch road. The recognition section calculates feature values as road parameters including a curvature of the lane boundary line candidate detected by the detection section, and recognizes the lane boundary line on the basis of the calculated feature values. The recognition section has a removing section, a curvature calculation section, and a suppression section. The removing section removes the lane boundary line candidate, which has been judged to correspond to the lane boundary line of the branch road by the branch judgement section, from the lane boundary line candidates. The curvature calculation section calculates a curvature of the lane boundary line candidate on the basis of an estimated rate of change of the curvature of the lane boundary line candidate. The suppression section resets the curvature calculated by the curvature calculation section to a past curvature of the lane boundary line candidate calculated predetermined-number of frame images before when the branch judgment section judged that the lane boundary line candidate corresponds to the lane boundary line of the branch road, and the suppression section resets the estimated rate of change of the curvature of the lane boundary line candidate to zero.

The lane boundary line recognition device according to an exemplary embodiment detects lane boundary line candidates (white line candidates) from the predetermined-number of frame images around the own vehicle on the roadway captured by the in-vehicle camera. The lane boundary line recognition device judges whether or not each of the lane boundary line candidates is a lane boundary line of a branch road. Further, the lane boundary line recognition device calculates feature values of the detected lane boundary line candidates such as a curvature of the detected lane boundary line candidate. The lane boundary line recognition device recognizes the lane boundary line of the roadway on the basis of the calculated feature values such as the calculated curvature of the lane boundary line candidate. At this time, the lane boundary line recognition device removes the lane boundary line candidate which corresponds to the lane boundary line of the branch road from a group of the lane boundary line candidates. Further, when the lane boundary line candidate corresponds to the lane boundary line of the branch road, the lane boundary line recognition device resets the curvature of the lane boundary line candidate to a past curvature which has been calculated the predetermined-number of frame images before, and resets the estimated rate of change of the curvature of the lane boundary line candidate to zero.

If the lane boundary line recognition device resets the estimated rate of change of the curvature to zero even if using a past curvature which has been calculated a predetermined-number of frame images before instead of using the currently-calculated curvature of the lane boundary line candidate, there is a possible case in which the curvature of the lane boundary line candidate to be successively calculated is shifted from the correct curvature of the white line as the lane boundary line of the own vehicle lane on the roadway due to the presence of the curvature of the white line (lane boundary line) of the branch road. In order to avoid this problem and calculate the correct curvature of the lane boundary line candidate of the own vehicle lane on the roadway, not the lane boundary line of the branch road, the lane boundary line recognition device resets the currently calculated curvature to the past curvature calculated the a predetermined-number of frame images before, and further resets the estimated rate of change of the curvature to zero. This makes it possible to suppress the influence of the presence of the lane boundary line of the branch road on the correct curvature of the lane boundary line candidate of the own vehicle lane on the roadway and increases the accuracy of recognizing the lane boundary line candidates of the own vehicle lane on the roadway.

BRIEF DESCRIPTION OF THE DRAWINGS

A preferred, non-limiting embodiment of the present invention will be described by way of example with reference to the accompanying drawings, in which:

FIG. 3 is a view showing an example when the lane boundary line recognition device according to the exemplary embodiment recognizes a branch road at a branch road junction;

FIG. 4 is a view showing another example when the lane boundary line recognition device according to the exemplary embodiment recognizes another branch road;

FIG. 7A to FIG. 7D show a recognizable distance, a curvature of a white line candidate, an estimated rate of change of the curvature and an estimated value of a second differential of the curvature;

DETAILED DESCRIPTION OF THE PREFERRED EMBODIMENTS

Figure 1:
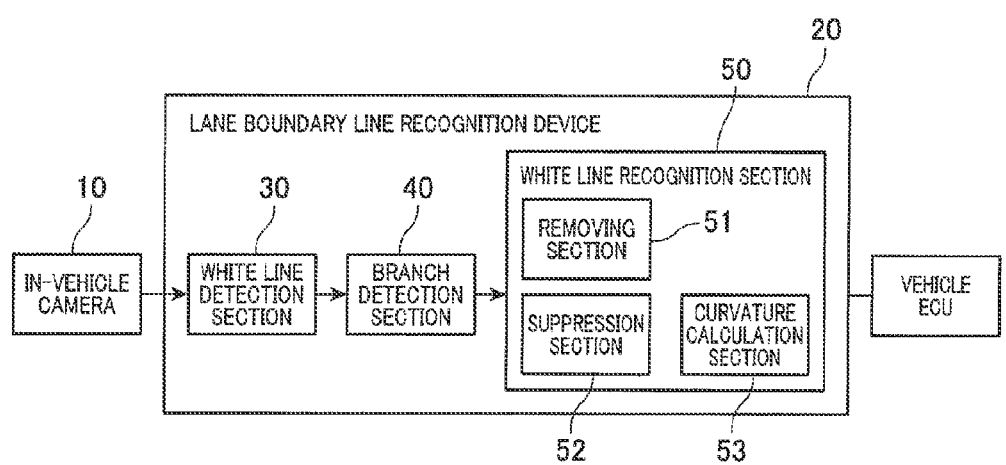
FIG. 1 is a block diagram showing a structure of a lane boundary line recognition device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a lane boundary line recognition device 20 according to an exemplary embodiment with reference to FIG. 1 to FIG. 9.

FIG. 1 is a block diagram showing a structure of the lane boundary line recognition device 20 according to the exemplary embodiment. The lane boundary line recognition device 20 according to the exemplary embodiment recognizes lane boundary lines on a roadway (i.e. own vehicle lane of the roadway) on which an own vehicle 70 drives. The recognized lane boundary lines are used for a drive assist such as a lane keeping assist control (LKA control) and a lane departure warning.

A description will now be given of the structure of the lane boundary line recognition device 20 according to the exemplary embodiment with reference to FIG. 1. An own vehicle 70 is equipped with the lane boundary line recognition device 20 according to the exemplary embodiment and the in-vehicle camera 10. The lane boundary line recognition device 20 receives image captured by and transmitted from the in-vehicle camera 10 mounted on the own vehicle 70. The lane boundary line recognition device 20 recognizes white lines (lane boundary lines as roadway markings) on the driveway.

The in-vehicle camera 10 is composed of at least one of a CCD (charge coupled device) camera, a CMOS (complementary Metal Oxide Semiconductor) sensor, a near infrared camera, etc.

Figure 2:
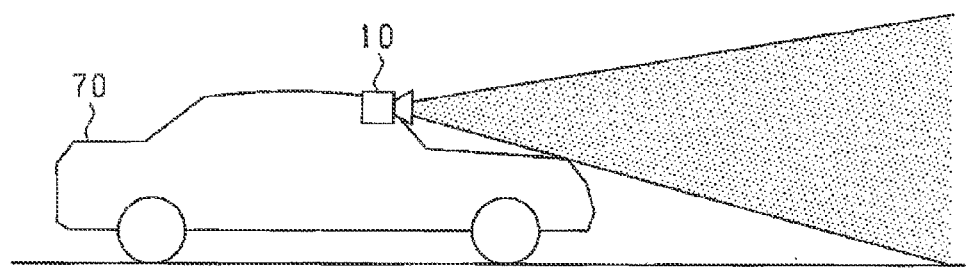
FIG. 2 is a side view showing an in-vehicle camera mounted on an own vehicle capable of capturing image of a surrounding area of the own vehicle.

FIG. 2 is a side view showing the in-vehicle camera 10 mounted on the own vehicle 70. The in-vehicle camera 10 captures image of a surrounding area of the own vehicle 70. In more detail, for example, the in-vehicle camera 10 is arranged near at upper side of a windshield of the own vehicle 70. The in-vehicle camera 10 captures frame images of a scene in front of the own vehicle 70 having a predetermined angle range. For example, the in-vehicle camera 10 captures the predetermined number of frame images per second. It is acceptable to use stereo cameras or a plurality of cameras in order to form the in-vehicle camera 10.

The lane boundary line recognition device 20 according to the exemplary embodiment is a computer system equipped with a central processing unit (CPU), a memory storage section (computer-readable storage medium) such as a random access memory (RAM), a read only memory (ROM), etc., and an input/output (I/O) interface, etc. The ROM stores a program capable of performing the functions of the lane boundary line recognition device 20. That is, the CPU reads and performs the program stored in the ROM as the computer-readable storage medium, and perform the program of executing the functions of a white line detection section 30 (or a detection section 30), a branch judgment section 40, and a white line recognition section 50 (or a recognition section 50). It is also possible to use another type of computer-readable storage medium, instead of using the ROM, in order to store the program for executing the functions of the lane boundary line recognition device 20. In this case, the computer system as the lane boundary line recognition device 20 reads and executes the program stored in the another type of the computer-readable memory storage medium.

That is, it is possible to realize the function of the lane boundary line recognition device 20 according to the exemplary embodiment by using one or more programs to be processed by the computer system.

The white line detection section 30 extracts edge points from each of frame images around the own vehicle 70 captured by the in-vehicle camera 10. The white line detection section 30 further extracts a plurality of pairs of white line candidates (as lane boundary line candidates).

The white line detection section 30 selects a pair of the white line candidates having a maximum priority from the plurality of the pairs of the white line candidates. The selected pair of the white line candidates having the maximum priority indicates the white line candidates having a plurality of features regarding white lines (as the lane boundary lines such as solid white lines, dotted white line, etc.) For example, the features of the while lines indicate to have an edge strength which is larger than a predetermined threshold value and a width of the white line which is approximately equal to a predetermined width.

The branch judgment section 40 calculates a likelihood of a white line of the branch road detected by the white line detection section 30. The branch judgment section 40 judges whether or not the white line candidate detected by the white line detection section 30 is the white line of the branch road. The branch feature calculation section 40 calculates a likelihood of a white line of the branch road detected by the white line detection section 30.

For example, the more each of the branch features is high, the more the branch feature calculation section 40 increases the likelihood of the white line candidate as the white line of the branch road. For example, the presence of a branch road is determined:

when the while line candidates at the right side and the left side on the own vehicle lane on the roadway, on which the own vehicle drives, have a low parallel degree;

when a recognizable distance L of the white line candidate monotonically decreases in the predetermined number of frame images; or when a curvature ρ of the roadway monotonically changes, etc. This recognizable distance L is a distance from the own vehicle to a farthest recognizable end point in a straight line of the white line candidate.

FIG. 3 is a view showing an example when the lane boundary line recognition device 20 according to the exemplary embodiment recognizes a branch road at a junction. FIG. 4 is a view showing another example when the lane boundary line recognition device 20 according to the exemplary embodiment recognizes another branch road.

FIG. 3 shows a case in which a width of the roadway (or the own vehicle lane of the roadway), on which the own vehicle drives, suddenly increases at a junction at which a branch road branches from the own vehicle lane on the roadway. FIG. 4 shows a case in which a width of the own vehicle lane on the roadway suddenly increases at a point from which the branch road branches from the own vehicle lane. In FIG. 3 and FIG. 4, the width of the own vehicle lane indicates a distance between the white lines at the right side and the left side of the own vehicle lane on the roadway.

When the branch road branches at a branch point from the own vehicle lane in front of the own vehicle 70, and the own vehicle 70 approaches the branch point on the own vehicle lane, the recognizable distance L of the white line candidate becomes short, i.e. monotonically decreases so long as the branch road branches at a sharp angle or a wide angle from the roadway at the branch point.

Further, the branch feature calculation section 40 integrates the likelihoods, calculated by the branch feature calculation section 41, which corresponds to the features of the branch road. The branch feature integration section 42 calculates an integrated branch likelihood X of the branch road. The calculated integrated likelihood of the branch road indicates a confidence degree of the white line of the branch road, i.e. a confidence degree whether or not the white line candidate is a white line of a branch road. In more detail, the branch feature integration section 42 calculates the integrated branch likelihood X by using an equation of $X = A \cdot B / [A \cdot B + (1-A) \cdot (1-B)]$ when integrating the branch likelihoods A and B. Each of the branch likelihood A, the branch likelihood B and the integrated branch likelihood X is within a range of 0 to 1.

That is, it is possible to sequentially calculate the integrated branch likelihood X when not less than three likelihoods are integrated. The branch judgment section 40 judges whether or not the white line candidate is the white line of the branch road on the basis of the integrated branch likelihood X which has been calculated.

The white line recognition section 50 has a removing section 51, a suppression section 52 and a curvature calculation section 53. The white line recognition section 50 calculates road parameters (feature values) of white line candidates detected by the white line detection section 30, and recognizes white lines of the own vehicle lane on the basis of the calculated road parameters. The road parameters include a curvature ρ of a white line (lane boundary line), a road width W of the roadway on which the own vehicle 70 drives, a location g of the own vehicle 70 in the road width W, an angle θ between a direction of travel of the curvature ρ and the white line, a pitching angle φ of the own vehicle 70 to the roadway, etc.

The removing section 51 removes a white line candidate which corresponds to a white line of a branch road judged by the branch judgment section 40 from a group of detected white line candidates. The remaining white line candidates are used for correctly recognizing the white lines of the own vehicle lane on which the own vehicle 70 drives. When the white lines in a pair at the right side and the left side of the own vehicle lane detected by the white line detection section 30 are the white line of the own vehicle lane and the white line of the branch road, respectively, because the removing section 51 correctly removes the white line of the branch road, the white line of the own vehicle lane remains in the group of the white line candidates. The white line of the branch road is correctly removed. Accordingly, the white line recognition section 50 uses the road parameters of the white line of the own vehicle lane in order to correctly recognize the white lines of the own vehicle lane. In other words, the white line recognition section 50 does not use the road parameters of the branch road, and use the road parameters regarding the white line candidates of the own vehicle lane.

When the branch judgment section 40 judges that the white line candidate corresponds to the white line of the branch road, the suppression section 52 performs the suppression process to avoid the influence of a curvature of the white line candidate of the branch road on a curvature ρ of the white line candidate of the white line of the own vehicle lane. In more detail, the suppression section 52 resets the road parameters including the curvature currently calculated to past road parameters including a past curvature ρ previously-calculated predetermined-number of frame images before when the branch judgment section 40 detects the presence of the branch road. That is, the suppression section 52 selects the curvature ρ and the other road parameters calculated on the basis of the white line candidate of the own vehicle lane before the branch road is detected.

There is a possible problem in which the curvature ρ2 of the white line of the branch road affects, i.e. causes the incorrect calculation of the curvature ρ of the white line candidate of the own vehicle lane so that the calculated curvature of the white line candidate departs from the correct curvature ρ of the white line of the own vehicle lane unless the white line recognition section 50 does not reset the estimated rate of change of the curvature ρ to zero even if the currently-calculated curvature of the white line candidate is switched only with the past curvature. In order to avoid this problem, the suppression section 52 resets the currently-calculated estimated rate of change of the curvature ρ to zero. The suppression section 52 further resets the estimated rate of a second differential of the curvature ρ to zero. By the way, the curvature calculation section 53 calculates the estimated rate of change of the curvature ρ and the estimated value of a second differential of the curvature ρ.

That is, the curvature calculation section 53 calculates an estimated value of a second differential of the curvature ρ of the white line candidate by a filtering using a Kalman filter, etc. That is, the curvature calculation section 53 calculates the estimated value of a second differential of the curvature ρ of the white line candidate on the basis of a history of a second differential of the curvature ρ of the white line candidate.

Further, the curvature calculation section 53 calculates an estimated rate of change of the curvature ρ of the white line candidate, i.e. an estimated value of a first differential of the curvature ρ of the white line candidate on the basis of the estimated value of a second differential of the curvature ρ of the white line candidate. The curvature calculation section 53 calculates the curvature ρ of the white line candidate on the basis of the estimated rate of change of the curvature ρ of the white line candidate. Specifically, the curvature calculation section 53 calculates the curvature ρ of the white line candidate and the estimated rate of change of the curvature ρ of the white line candidate by the filtering using the Kalman filter, etc. In other words, the curvature calculation section 53 calculates the estimated rate of change of the curvature ρ of the white line candidate on the basis of the change history of the curvature ρ of the white line candidate.

Still further, the curvature calculation section 53 successively calculates the estimated rate of change of the curvature ρ of the white line candidate on the basis of the estimated value of a second differential of the curvature ρ of the white line candidate which has been reset to zero when the branch judgment section 40 judges that the white line candidate is a white line of a branch road.

Still further, when the branch judgment section 40 judges that the white line candidate is a white line of a branch road, the curvature calculation section 53 can successively calculate the curvature ρ of the white line candidate on the basis of the past curvature ρ of the white line candidate calculated predetermined-number of frame images before and the estimated rate of change of the curvature ρ of the white line candidate which has been reset to zero.

This makes it possible for the curvature calculation section 53 to successively calculate the curvature ρ of the white line candidate along the own vehicle lane (or the main lane) on which the own vehicle drives during the time period in which no straight line is detected in the white line candidate around the branch road junction shown in FIG. 3 and FIG. 4.

In addition, during the time period in which no straight line of the white line candidate at the right side of the own vehicle lane (on the main roadway) at the junction of the branch road (branch road junction) is detected, the curvature calculation section 53 successively calculates the road parameters other than the curvature ρ of the white line candidate. The curvature calculation section 53 does not use in the white line recognition the road parameters calculated during the period in which no straight line is detected in the white line candidate.

When the straight line of the white line candidate is detected again after the own vehicle passes through the branch road junction, the road parameters successively calculated are used for the white line recognition after the own vehicle passes through the branch road junction.

Next, a description will now be given of the process of recognizing the white lines of the own vehicle lane (on the main roadway) with reference to FIG. 5.

Figure 5:
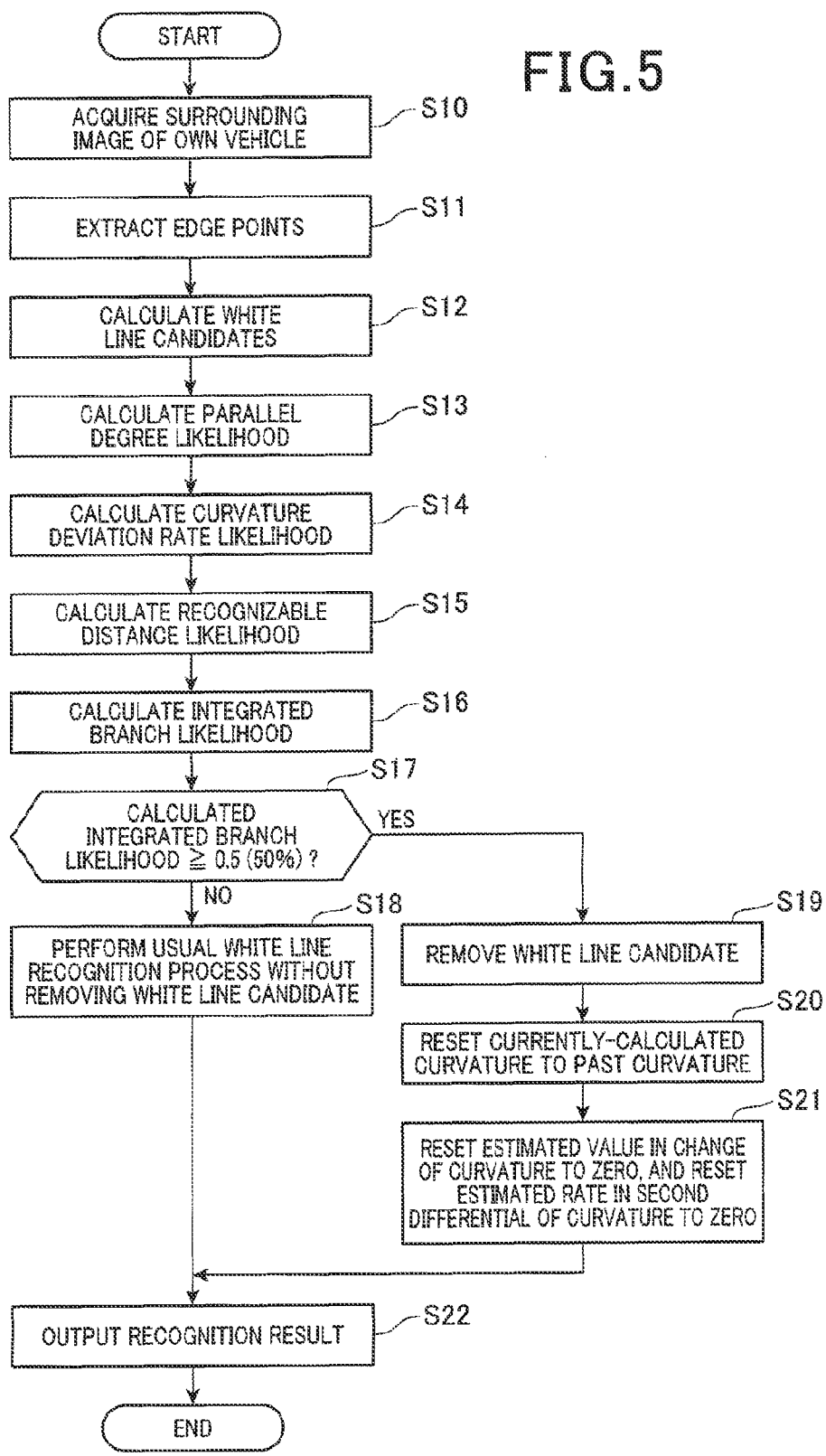
FIG. 5 is a flow chart showing a process of recognizing a white line as a lane boundary line on a roadway, on which the own vehicle drives, according to the exemplary embodiment.

FIG. 5 is a flow chart showing the process of recognizing a white line as a lane boundary line on the roadway, on which the own vehicle drives, according to the exemplary embodiment.

The lane boundary line recognition device 20 repeatedly performs the process shown in the flow chart in FIG. 5 every frame images.

In step S10, the in-vehicle camera 10 captures images of a surrounding area of the own vehicle 70, which includes images around the own vehicle 70 and in front of the own vehicle 70. The lane boundary line recognition device 20 receives the image transmitted from the in-vehicle camera 10, and converts the received image to planar image viewed from a top of the roadway. The operation flow goes to step S11.

In step S11, the lane boundary line recognition device 20 extracts edge points having a large brightness change rate in a horizontal direction of the image by using a filter such as a Sobel filter. The operation flow goes to step S12.

In step S12, the lane boundary line recognition device 20 performs the Hough transform of the extracted edge points to obtain a plurality of pairs of white line candidates at the right side and the left side of the roadway (or the own vehicle lane) of the own vehicle 70. The lane boundary line recognition device 20 extracts a pair of the white line candidates having a maximum priority of the white line. The operation flow goes to step S13.

In step S13, the branch judgment section 40 in the lane boundary line recognition device 20 calculates a likelihood of a white line of a branch road on the basis of the selected pair of the white line candidates at the right side and the left side on the own vehicle lane on the roadway, and performs the branch road judgment on the basis of the calculated likelihood of the white line candidates. That is, the branch judgment section 40 calculates a parallel degree likelihood which is one of the likelihoods to be used for detecting a white line of a branch road.

In more detail, the branch judgment section 40 calculates a yaw angle θ of each of the white line candidates of the pair at the right side and the left side. A difference between the calculated yaw angles θ indicates a parallel degree of the white line candidates at the right side and the left side. The more the difference is small, the more the parallel degree of the pair of the white line candidates increases. That is, when the difference of the calculated yaw angles θ becomes zero, the white line candidate has a maximum parallel degree. When one of the white line candidates in the pair is a white line of the branch road, these white line candidates of the pair have a low parallel degree. In other words, the more the parallel degree of the white line candidate in the pair at the right side and the left side on the roadway is low, i.e. the more the difference between the yaw angles θ increases, the branch judgment section 40 increases the parallel degree likelihood. The operation flow goes to step S14.

In step S14, the branch judgment section 40 in the lane boundary line recognition device 20 calculates a curvature deviation rate likelihood of the white line candidate as one of the likelihoods of the white line of a branch road. In more detail, the branch judgment section 40 calculates a curvature ρ of each of the white line candidates in the pair at the right side and the left side. When the white line candidate curves at the left side, the curvature ρ of the white line candidate has a positive value. On the other hand, when the white line candidate curves at the right side, the curvature ρ of the white line candidate has a negative value. The branch judgment section 40 calculates a change rate of the curvature ρ of the white line candidate in a current frame image to a curvature ρ of the white line candidate in a previous frame image, that is, calculates a change rate of the curvature ρ of the white line candidate which corresponds to the curvature deviation rate likelihood.

The branch judgment section 40 in the lane boundary line recognition device 20 further considers a deviation rate of the curvature ρ of the white line candidate in the predetermined number of frame images immediately before the current frame image.

When a branch road branches from the own vehicle lane at a junction of the roadway on which the own vehicle 70 drives, a radius of the curvature ρ of the white line candidate becomes an infinite value at the junction at which the branch road branches from the roadway. Further, the radius of the curvature of the white line candidate becomes small after passing through the junction. Accordingly, an absolute value of the curvature ρ of the white line candidate calculated on the basis of the white line candidate of the branch road becomes more increasing in the frame image which more approaches the branch road. On the other hand, an absolute value of the curvature ρ of the white line candidate calculated on the basis of the white line candidate of the roadway (as the own vehicle lane on which the own vehicle 70 drives) does not monotonically change in the frame images immediately before the current frame image.

Accordingly, when the absolute value of the curvature ρ of the white line candidate in the predetermined number of frame images monotonically increases, the branch judgment section 40 in the lane boundary line recognition device 20 according to the exemplary embodiment increases the curvature deviation rate likelihood of the white line candidate in order to increase the integrated branch likelihood X. In more detail, when the absolute value of the curvature ρ of the white line candidate in the predetermined number of the frame images monotonically increases, the branch judgment section 40 calculates the curvature deviation rate likelihood of the white line candidate so that the integrated branch likelihood X becomes not less than a judgment threshold value. The operation flow goes to step S15.

In step S15, the branch judgment section 40 in the lane boundary line recognition device 20 calculates a recognizable distance likelihood as one of the likelihoods to determine a white line of a branch road. In more detail, the branch judgment section 40 calculates a length of a straight part of the white line candidate, i.e. the recognizable length L. This recognizable length L is a distance to the farthest end on the straight line of the white line candidate.

FIG. 6 is a schematic view showing an own vehicle lane on a roadway and a branch road which branches, in front of the own vehicle 70, from the own vehicle lane on the roadway. As shown in FIG. 6, no edge point is extracted at the area which is far from the farthest end on the straight line of the white line candidate designated by the solid line at the right side on the own vehicle lane.

The branch judgment section 40 detects a change of the recognizable distance L in the predetermined number of images obtained immediately before the current frame image. When a branch road branches from the own vehicle lane on the roadway, in front of the own vehicle, on which the own vehicle 70 drives, the more the recognizable distance L calculated by using the white line candidate of the branch road becomes short in a plurality of the frame images as the own vehicle more approaches the branch road. On the other hand, the recognizable distance L calculated from the white line candidate of the own vehicle lane on the roadway approximately does not change in the predetermined number of the image obtained immediately before the current frame image when the white line is a solid white line, and increases and decreases when the white line is a dotted white line.

When the recognizable distance L of the white line candidate monotonically decreases in the predetermined number of the frame images, the branch judgment section 40 calculates the recognizable distance likelihood so as to increase the integrated branch likelihood X which will be calculated later. In more detail, when the recognizable distance L monotonically decreases in the predetermined number of the frame images, the branch judgment section 40 calculates the recognizable distance likelihood so that the integrated branch likelihood X becomes not less than the judgment threshold value. It is acceptable for the branch judgment section 40 to use a part of the predetermined number of the previously obtained frame images and the currently obtained frame image. The operation flow goes to step S16.

In step S16, the branch judgment section 40 in the lane boundary line recognition device 20 calculates the integrated branch likelihood, i.e. integrates the parallel degree likelihood calculated in step S13, the curvature deviation rate likelihood of the white line candidate calculated in step S14 and the recognizable distance likelihood calculated in step S15 in order to calculate the integrated branch likelihood X. The operation flow goes to step S17.

In step S17, the white line recognition section 50 in the lane boundary line recognition device 20 further detects whether the integrated branch likelihood X calculated in step S16 is not less than 0.5 (50%).

When the detection result in step S17 indicates negation ("NO" in step S17), i.e. the integrated branch likelihood X calculated in step S16 is less than 0.5 (50%), the white line recognition section 50 judges that the white line candidate is not the white line of the branch road.

On the other hand, when the detection result in step S17 indicates affirmation ("YES" in step S17), i.e. the integrated branch likelihood X calculated in step S16 is not less than 0.5 (50%), the white line recognition section 50 judges that the white line candidate is the white line of the branch road. It is acceptable for the white line recognition section 50 to use another value instead of using the value of not less than 0.5 (50%). The operation flow goes to step S18.

In step S18, when the judgment result in step S17 indicates negation ("NO" in step S17), i.e. indicates that the white line candidate is not the white line of the branch road, the removing section 51 in the white line recognition section 50 does not remove this white line candidate from the overall white line candidates, and the white line recognition section 50 in the lane boundary line recognition device 20 performs the usual white line recognition process. That is, the lane white line recognition section 50 judges that the selected white line candidates at the right side and the left side are the white lines of the own vehicle lane on the roadway on which the own vehicle 70 drives. The operation flow goes to step S19.

On the other hand, when the lane boundary line recognition device 20 judges that the white line candidate is the white line of the branch road, the removing section 51 in the white line recognition section 50 removes this white line candidate from the overall white line candidates in step S19. That is, when one of the white line candidates in the pair is the white line of the branch road, the removing section 51 removes the white line candidate corresponding to the white line of the branch road from the overall white line candidates. Accordingly, the white line recognition section 50 recognizes the white line candidate of the own vehicle lane only. The operation flow goes to step S20.

In step S20, the suppression section 52 in the white line recognition section 50 resets the currently-calculated curvature and other road parameters to the past curvature ρ of the white line candidate and the past road parameters previously calculated predetermined-number of frame images before. The operation flow goes to step S21.

In step S21, the lane boundary line recognition device 20 resets the estimated rate of change of the curvature ρ of the white line candidate and the estimated value of a second differential of the curvature ρ of the white line candidate to zero, respectively.

The lane boundary line recognition device 20 successively calculates the curvature ρ of the white line candidate on the basis of the past curvature ρ of the white line candidate, the estimated value of the rate of change of the curvature ρ of the white line candidate which has been reset to zero, and the estimated value of a second differential of the curvature ρ of the white line candidate which has been reset to zero until the timing when detecting the white line candidate at the right side of the own vehicle lane on the roadway. The operation flow goes to step S22.

In step S22, the lane boundary line recognition device 20 outputs the recognition result of the white lines, i.e. calculated road parameters to a vehicle ECU. When recognizing the white line candidates in the pair at the right side and the left side on the own vehicle lane of the roadway on which the own vehicle 70 drives, the lane boundary line recognition device 20 outputs, to the vehicle ECU, the road parameters calculated on the basis of the white line candidates in the pair at the right side and the left side of the own vehicle lane.

On the other hand, when recognizing one of the white line candidates as the white line on the own vehicle lane, the lane boundary line recognition device 20 outputs the road parameters calculated on the basis of the one of the white line candidates to the vehicle ECU. The lane boundary line recognition device 20 completes the process shown in FIG. 5.

Figure 6A:
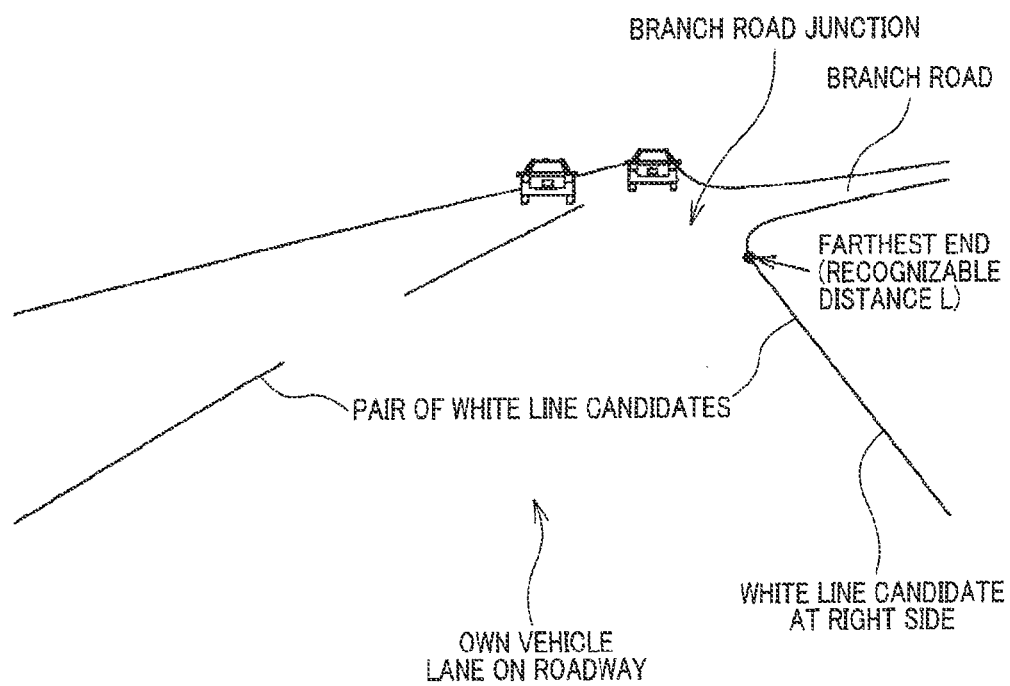
FIG. 6A is a view showing a scene before the own vehicle passes through a branch road junction.
Figure 6B:
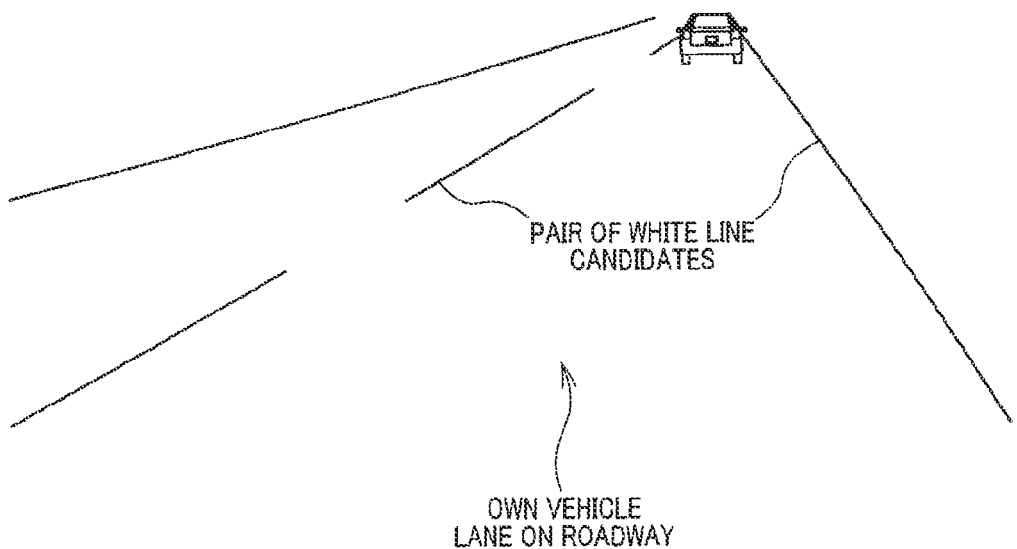
FIG. 6B is a view showing a scene after the own vehicle passes through the branch road junction.

FIG. 6A is a view showing a scene before the own vehicle passes through a branch road junction. That is, FIG. 6A shows a scene in which a branch road (or a branch road junction) is present in front of the own vehicle on the own vehicle lane. FIG. 6B is a view showing a scene after the own vehicle has passed through the branch road junction.

FIG. 7A to FIG. 7D show an estimated recognizable distance L, the curvature (1/m), the estimated rate in change of the curvature ρ of the white line candidate, and the estimated value of a second differential of the curvature ρ of the white line candidate at the right side of the own vehicle lane when the own vehicle passes through the branch road junction.

In particular, FIG. 7B shows the curvature ρ of the white line candidate without returned to the past curvature after the presence of the branch road is detected. FIG. 7C and FIG. 7D show the estimated value of the rate of change of the curvature ρ of the white line candidate and the estimated value of a second differential of the curvature ρ of the white line candidate, respectively without resetting to zero after the presence of the branch road is detected.

In FIG. 7A to FIG. 7D, the horizontal axis indicates time, the following parameters move toward the right side from zero according to the time elapse, and return to the zero after the following parameters reach N. The parameters are the estimated recognizable distance L, the curvature (1/m), the estimated value of the rate of change of the curvature ρ of the white line candidate, and the estimated value of a second differential of the curvature ρ of the white line candidate at the right side of the own vehicle lane.

Further, as shown in FIG. 7A to FIG. 7D, the current location of the own vehicle is indicated by the reference character "P". The values immediately at the right side of the point P indicate the values calculated on the basis of the last frame image. On the other hand, the values close to the left side of the point P indicate the values calculated on the basis of the frame images obtained immediately before the current time. In FIG. 7A to FIG. 7D, the own vehicle 70 has passed through the branch road junction.

As shown in FIG. 7A, because the recognizable distance L of the white line candidate is monotonically decreasing before the point N, the lane boundary line recognition device 20 judges that the white line candidate is the white line of the branch road.

Further, as shown in FIG. 7B, because the absolute value of the curvature ρ of the white line candidate is monotonically increased before the point N, it is detected that the white line candidate is the white line of the branch road. That is, the branch judgment section 40 in the lane boundary line recognition device 20 judges that the white line candidate is the white line of the branch road.

After the judgment result indicates the detection of the branch road previously described, the currently-calculated curvature ρ of the white line candidate does not return to the curvature ρ of the white line of the own vehicle lane on the main roadway, the curvature ρ of the white line candidate has a large overshoot due to the curvature ρ of the white line of the branch road.

Figure 8:
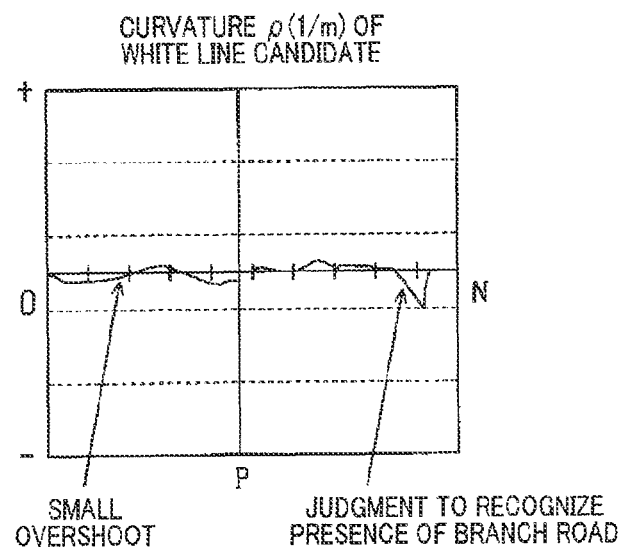
FIG. 8 is a view showing a curvature of the white line candidate obtained by a suppression process after the judgment result indicates the detection of the branch road.

FIG. 8 is a view showing a curvature (1/m) of the white line candidate obtained by the suppression section or the suppression process after the judgment result indicates the detection of the branch road. The suppression section 52 in the white line recognition section 50 of the lane boundary line recognition device 20 resets the currently-calculated curvature to the past curvature ρ of the white line candidate previously calculated when the branch road is detected. FIG. 8 shows the curvature ρ of the white line candidate when the estimated value of a second differential of the curvature ρ is set to zero.

As compared with the case shown in FIG. 7B, FIG. 8 shows the case having a small overshoot of the curvature ρ of the white line candidate after the branch road is detected, and the curvature ρ affected by the presence of the branch road shows a speedy return to the curvature ρ of the white line candidate of the main road as the own vehicle lane on the roadway.

Figure 9A:
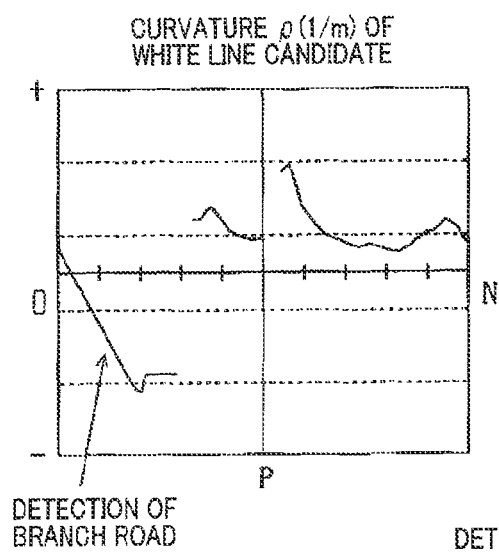
FIG. 9A is a view showing a curvature of the white line candidate without processing of the suppression process after the judgment result indicates the detection of the branch road.
Figure 9B:
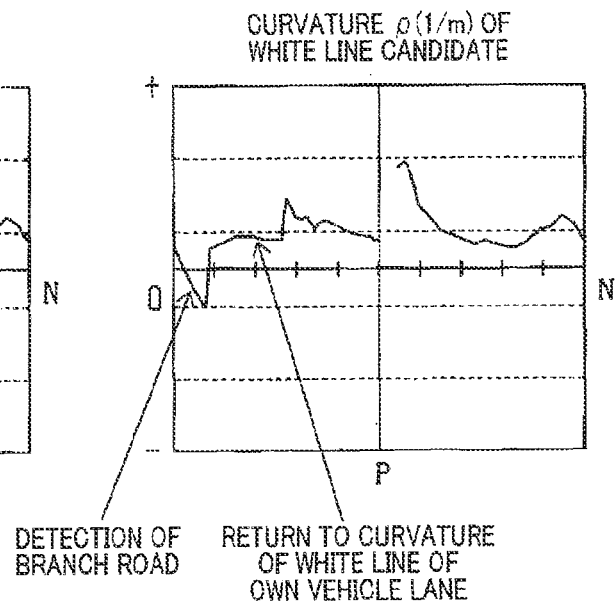
FIG. 9B is a view showing a curvature of the white line candidate processed by the suppression process after the judgment result indicates the detection of the branch road.

FIG. 9A and FIG. 9B show the curvature when the own vehicle lane is a curved lane and has a branch road junction. The curvature ρ of the white line candidate shown in FIG. 9A corresponds to the curvature ρ of the white line candidate shown in FIG. 7B. The curvature ρ of the white line candidate shown in FIG. 9B corresponds to the curvature ρ2 of the white line candidate shown in FIG. 8.

In the case shown in FIG. 9A, after the judgment result indicates the detection of the branch road, because the curvature ρ of the white line candidate has a large overshoot due to the curvature ρ of the white line of the branch road, it takes a long period of time for the curvature ρ of the white line candidate to return to the curvature ρ of the white line candidate of the own vehicle lane on the main roadway.

On the other hand, after the judgment result indicates the detection of the branch road, because the curvature ρ of the white line candidate has a small overshoot in the case shown in FIG. 9B, the curvature ρ of the white line candidate quickly and stably returns to the curvature ρ of the white line candidate of the own vehicle lane on the main roadway.

The boundary line recognition device 20 according to the exemplary embodiment has the following effects.

When judging that the white line candidate is a white line of a branch road, the lane boundary line recognition device 20 resets the current curvature ρ of the white line candidate to the past curvature ρ of the white line candidate, and the suppression section 52 in the white line recognition section 50 of the lane boundary line recognition device 20 resets the estimated rate of change of the curvature ρ to zero. This makes it possible to suppress the influence of the white line of the branch road on the correct recognition of the white line candidate, and increase the accuracy of the white line of the main road as the own vehicle lane on the roadway.

When judging that the white line candidate is the white line of the branch road, the lane boundary line recognition device 20 resets the estimated value of a second differential of the curvature ρ of the white line candidate to zero. This makes it possible to suppress the influence of the white line of the branch road on the calculation of the curvature ρ of the white line candidate of the own vehicle lane on the main roadway after the curvature ρ of the white line candidate is reset to the past curvature ρ of the white line candidate of the own vehicle lane on the main roadway. This makes it possible to suppress the influence of the white line of the branch road on the correct recognition of the white line candidate of the own vehicle lane on the main roadway, and to increase the recognition accuracy of the white line of the own vehicle lane on the main roadway.

Because the lane boundary line recognition device 20 successively calculates the estimated rate of change of the curvature ρ of the white line candidate on the basis of the estimated value of a second differential of the curvature ρ which has been reset to zero, it is possible to quickly reset the current curvature ρ to the past curvature ρ (affected from the presence of the branch road) to the curvature of the white line candidate of the own vehicle lane on the main roadway, and stably use the curvature of the white line candidate of the own vehicle lane.

Because the lane boundary line recognition device 20 successively calculates the curvature ρ of the white line candidate on the basis of the estimated rate of change of the curvature ρ of the white line candidate which has been reset to zero, it is possible to quickly return the current curvature ρ of the white line candidate (affected from the presence of the branch road) to the curvature ρ of the white line of the main road as the own vehicle lane on the roadway.

(Other Modifications)

When judging that the white line candidate is the white line of the branch road, the lane boundary line recognition device 20 does not reset the estimated value of a second differential of the curvature ρ of the white line candidate to zero. This makes it possible to prevent the influence of the white line of the branch road on the calculation of the curvature ρ of the white line candidate of the main road. In this case, if the lane boundary line recognition device 20 resets the estimated value of a second differential of the curvature ρ of the white line candidate to zero, it is possible to further prevent the influence of the white line of the branch road to the calculation of the curvature ρ of the white line candidate of the main road, like the first exemplary embodiment previously described.

When judging whether or not the white line candidate is the white line of the branch road, it is acceptable for the lane boundary line recognition device 20 to calculate, as the likelihoods indicating the white line of the branch road, at least one of the curvature deviation rate likelihood of the white line candidate, the parallel degree likelihood and the recognizable distance likelihood. Still further, it is also acceptable for the lane boundary line recognition device 20 to calculate, as the likelihoods indicating the white line of the branch road, all of the curvature deviation rate likelihood of the white line candidate, the parallel degree likelihood and the recognizable distance likelihood.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A lane boundary line recognition device comprising:
   a detection section, using a processor, capable of detecting lane boundary line candidates of a roadway on the basis of frame images of the roadway around an own vehicle transmitted from an in-vehicle camera;
   a branch judgment section, using a processor, capable of judging whether the lane boundary line candidate detected by the detection section corresponds to a lane boundary line of a branch road; and
   a recognition section, using a processor, capable of calculating feature values comprising a curvature of the lane boundary line candidate detected by the detection section, and recognizing the lane boundary line on the basis of the calculated feature values, the recognition section comprising:
   a removing section, using a processor, capable of removing the lane boundary line candidate, which has been judged to correspond to the lane boundary line of the branch road by the branch judgement section, is removed from the lane boundary line candidates;
   a curvature calculation section, using a processor, capable of calculating a curvature of the lane boundary line candidate on the basis of an estimated rate of change of the curvature of the lane boundary line candidate; and
   a suppression section, using a processor, capable of resetting the curvature calculated by the curvature calculation section to a past curvature of the lane boundary line candidate calculated a predetermined number of frame images before when the branch judgment section judges that the lane boundary line candidate corresponds to the lane boundary line of the branch road, and resetting the estimated rate of change of the curvature of the lane boundary line candidate to zero, wherein the curvature calculation section calculates the curvature of the lane boundary line candidate on the basis of an estimated rate of a second differential of the curvature of the lane boundary line candidate, and the suppression section resets the estimated value of the second differential of the curvature of the lane boundary line candidate to zero when the branch judgment section judges that the lane boundary line candidate corresponds to the lane boundary line of the branch road.

2. The lane boundary line recognition device according to claim 1, wherein when the branch judgment section judges that the lane boundary line candidate corresponds to the lane boundary line of the branch road, the curvature calculation section successively calculates the estimated rate of change of the curvature of the lane boundary line on the basis of the estimated value of a second differential of the curvature of the lane boundary line candidate which has been reset to zero.

3. The lane boundary line recognition device according to claim 2, wherein when the branch judgment section judges that the lane boundary line candidate corresponds to the lane boundary line of the branch road, the curvature calculation section successively calculates the curvature of the lane boundary line candidate on the basis of the past curvature of the lane boundary line candidate calculated the predetermined number of frame images before and the estimated rate of change of the curvature of the lane boundary line candidate which has been reset to zero.

4. The lane boundary line recognition device according to claim 1, wherein when the branch judgment section judges that the lane boundary line candidate corresponds to the lane boundary line of the branch road, the curvature calculation section successively calculates the curvature of the lane boundary line candidate on the basis of the past curvature of the lane boundary line candidate calculated the predetermined number of frame images before and the estimated rate of change of the curvature of the lane boundary line candidate which has been reset to zero.

5. The lane boundary line recognition device according to claim 1, wherein when the branch judgment section judges that the lane boundary line candidate corresponds to the lane boundary line of the branch road, the curvature calculation section successively calculates the curvature of the lane boundary line candidate on the basis of the past curvature of the lane boundary line candidate calculated the predetermined number of frame images before and the estimated rate of change of the curvature of the lane boundary line candidate which has been reset to zero.

6. A non-transitory computer-readable storage medium for storing a program for causing a central processing unit in a computer system to execute the functions of the lane boundary line recognition device according to claim 1.

7. A computer-implemented method, performed by a processor, for recognizing a lane boundary line comprising:
detecting lane boundary line candidates of a roadway on the basis of frame images of the roadway around an own vehicle transmitted from an in-vehicle camera;
judging whether the detected lane boundary line candidate corresponds to a lane boundary line of a branch road; and
calculating feature values comprising a curvature of the detected lane boundary line candidate, and recognizing the lane boundary line on the basis of the calculated feature values, wherein recognizing the lane boundary line further comprises:
removing the lane boundary line candidate, which has been judged to correspond to the lane boundary line of the branch road, from the lane boundary line candidates;
calculating a curvature of the lane boundary line candidate on the basis of an estimated rate of change of the curvature of the lane boundary line candidate;
resetting the calculated curvature to a past curvature of the lane boundary line candidate calculated a predetermined number of frame images prior when it is detected that the lane boundary line candidate corresponds to the lane boundary line of the branch road; and
resetting the estimated rate of change of the curvature of the lane boundary line candidate to zero, wherein
the curvature of the lane boundary line candidate is calculated on the basis of an estimated rate of a second differential of the curvature of the lane boundary line candidate, and
the estimated value of the second differential of the curvature of the lane boundary line candidate is reset to zero when it is judged that the lane boundary line candidate corresponds to the lane boundary line of the branch road.

8. The method for recognizing a lane boundary line according to claim 7, wherein when it is judged that the lane boundary line candidate corresponds to the lane boundary line of the branch road, the estimated rate of change of the curvature of the lane boundary line is successively calculated on the basis of the estimated value of a second differential of the curvature of the lane boundary line candidate which has been reset to zero.

9. The method for recognizing a lane boundary line according to claim 8, wherein when it is judged that the lane boundary line candidate corresponds to the lane boundary line of the branch road, the curvature calculation section successively calculates the curvature of the lane boundary line candidate on the basis of the past curvature of the lane boundary line candidate calculated the predetermined number of frame images before and the estimated rate of change of the curvature of the lane boundary line candidate which has been reset to zero.

10. The method for recognizing a lane boundary line according to claim 7, wherein when it is judged that the lane boundary line candidate corresponds to the lane boundary line of the branch road, the curvature of the lane boundary line candidate is successively calculated on the basis of the past curvature of the lane boundary line candidate calculated the predetermined number of frame images before and the estimated rate of change of the curvature of the lane boundary line candidate which has been reset to zero.

11. The method for recognizing a lane boundary line according to claim 7, wherein when it is judged that the lane boundary line candidate corresponds to the lane boundary line of the branch road, the curvature calculation section successively calculates the curvature of the lane boundary line candidate on the basis of the past curvature of the lane boundary line candidate calculated the predetermined number of frame images before and the estimated rate of change of the curvature of the lane boundary line candidate which has been reset to zero.

12. A system for recognizing a lane boundary line comprising:

a central processor;

a computer-readable storage medium; and a set of computer-executable instructions stored on the computer-readable storage medium that cause the central processor to:

detect lane boundary line candidates of a roadway on the basis of frame images of the roadway around an own vehicle transmitted from an in-vehicle camera;

judge whether the detected lane boundary line candidate corresponds to a lane boundary line of a branch road; and calculate feature values comprising a curvature of the detected lane boundary line candidate, and recognizing the lane boundary line on the basis of the calculated feature values, wherein recognizing the lane boundary line further comprises:

removing the lane boundary line candidate, which has been judged to correspond to the lane boundary line of the branch road, from the lane boundary line candidates;

calculating a curvature of the lane boundary line candidate on the basis of an estimated rate of change of the curvature of the lane boundary line candidate;

resetting the calculated curvature to a past curvature of the lane boundary line candidate calculated a predetermined number of frame images prior when it is detected that the lane boundary line candidate corresponds to the lane boundary line of the branch road; and resetting the estimated rate of change of the curvature of the lane boundary line candidate is reset to zero, wherein the curvature of the lane boundary line candidate is calculated on the basis of an estimated rate of a second differential of the curvature of the lane boundary line candidate, and the estimated value of the second differential of the curvature of the lane boundary line candidate is reset to zero when the branch judgment section judges that the lane boundary line candidate corresponds to the lane boundary line of the branch road.

13. The system according to claim 12, wherein when it is judged that the lane boundary line candidate corresponds to the lane boundary line of the branch road, the estimated rate of change of the curvature of the lane boundary line is successively calculated on the basis of the estimated value of a second differential of the curvature of the lane boundary line candidate which has been reset to zero.

14. The system according to claim 13, wherein when it is judged that the lane boundary line candidate corresponds to the lane boundary line of the branch road, the curvature calculation section successively calculates the curvature of the lane boundary line candidate on the basis of the past curvature of the lane boundary line candidate calculated the predetermined number of frame images before and the estimated rate of change of the curvature of the lane boundary line candidate which has been reset to zero.

15. The system according to claim 12, wherein when it is judged that the lane boundary line candidate corresponds to the lane boundary line of the branch road, the curvature of the lane boundary line candidate is successively calculated on the basis of the past curvature of the lane boundary line candidate calculated the predetermined number of frame images before and the estimated rate of change of the curvature of the lane boundary line candidate which has been reset to zero.

16. The system according to claim 12, wherein when it is judged that the lane boundary line candidate corresponds to the lane boundary line of the branch road, the curvature calculation section successively calculates the curvature of the lane boundary line candidate on the basis of the past curvature of the lane boundary line candidate calculated the predetermined number of frame images before and the estimated rate of change of the curvature of the lane boundary line candidate which has been reset to zero.

* * * * *

UNITED STATES PATENT AND TRADEMARK OFFICE
CERTIFICATE OF CORRECTION

PATENT NO. : 9,542,607 B2
APPLICATION NO. : 14/790471
DATED : January 10, 2017
INVENTOR(S) : Yuu Maeda et al.

Page 1 of 1

It is certified that error appears in the above-identified patent and that said Letters Patent is hereby corrected as shown below:

In Column 3 at Line 20, Change "the a" to --the--.

In Column 7 at Line 9, Change "ρ2" to --ρ--.

In Column 7 at Line 50, After "candidate" insert --.--.

In Column 13 at Line 9, Change "ρ2" to --ρ--.

Signed and Sealed this
Twenty-eighth Day of May, 2019

Andrei Iancu
*Director of the United States Patent and Trademark Office*